United States Patent
Bigelow (12)

(10) Patent No.: US 6,962,310 B1
(45) Date of Patent: Nov. 8, 2005

(54) INFLATABLE SATELLITE BUS

(75) Inventor: Robert T. Bigelow, Las Vegas, NV (US)

(73) Assignee: Bigelow Aerospace, North Las Vegas, NV (US)

(*) Notice: Subject to any disclaimer, the term of this patent is extended or adjusted under 35 U.S.C. 154(b) by 0 days.

(21) Appl. No.: 10/981,195

(22) Filed: Nov. 4, 2004

(51) Int. Cl.$^7$ ............................................. B64G 1/00
(52) U.S. Cl. ............................................. 244/158 R
(58) Field of Search .................... 244/158 R, 164, 244/172

(56) References Cited

U.S. PATENT DOCUMENTS

| | | | |
|---|---|---|---|
| 4,394,780 A | * | 7/1983 | Mooradian .................. 398/125 |
| 5,345,238 A | * | 9/1994 | Eldridge et al. ................ 342/3 |
| 5,641,135 A | * | 6/1997 | Stuart et al. ................. 244/173 |
| 6,107,952 A | * | 8/2000 | Barker et al. ................. 342/13 |
| 6,231,010 B1 | | 5/2001 | Schneider et al. |
| 6,373,449 B1 | * | 4/2002 | Bokulic et al. ............. 343/915 |
| 6,536,712 B1 | * | 3/2003 | Barenett ................. 244/158 R |
| 6,547,189 B1 | | 4/2003 | Raboin et al. |
| 6,568,640 B1 | * | 5/2003 | Barnett ........................ 244/173 |
| 6,585,193 B1 | * | 7/2003 | Kustas et al. ................ 244/169 |
| 6,647,668 B1 | * | 11/2003 | Cohee et al. ..................... 52/1 |

* cited by examiner

Primary Examiner—J. Woodrow Eldred
(74) Attorney, Agent, or Firm—Franklin E. Gibbs

(57) ABSTRACT

An inflatable satellite bus is claimed for use with a mission payload. The inflatable satellite bus is comprised of a core adapted to receive a mission payload. There is an expandable shell attached to the core and substantially enclosing the core. The core has an attitude control device and a power system attached to the core and operated by a controller.

17 Claims, 2 Drawing Sheets

INFLATABLE SATELLITE BUS

BACKGROUND OF THE INVENTION

1. Field of the Invention

This invention relates to an inflatable satellite bus for use with mission payloads.

2. Description of the Prior Art

Many satellites are composed of two main elements; the payload and the bus. The payload contained the equipment that was mission specific to the satellite's intended purpose. The bus provided support functions common to most satellites such as attitude control, power, and telemetry.

The separation of functions common to most satellites into a bus allowed for the development of a standard base to support a variety of satellites. One advantage to a standard bus is that the bus affords a known footprint for the satellite payload. While such an approach supports a standard that satellite manufactures may rely upon in preparing a payload, the footprint becomes a limiting factor in the design of satellites.

What is needed is a satellite bus that provides a more flexible base for the payload. While inflatable craft are known in the human habitat arena as evidenced by U.S. Pat. No. 6,231,010 to Schneider et al and U.S. Pat. No. 6,547,189 to Raboin et al, the present invention addresses the application of the principles of inflatable structures to operate as a bus for satellites.

SUMMARY OF THE INVENTION

The inflatable satellite bus is comprised of a core and an inflatable shell attached to the core. The core has an internal volume that is adapted to receive payloads including mission specific payloads. There is also an attitude control device coupled to the core, a power source coupled to the core, and a controller connected to the power source and the attitude control device. The controller directs the attitude control device. The inflatable satellite bus may also have a communications device for receiving commands from a ground station to facilitate operating the controller.

DETAILED DESCRIPTION OF THE DRAWINGS

Figure 1:
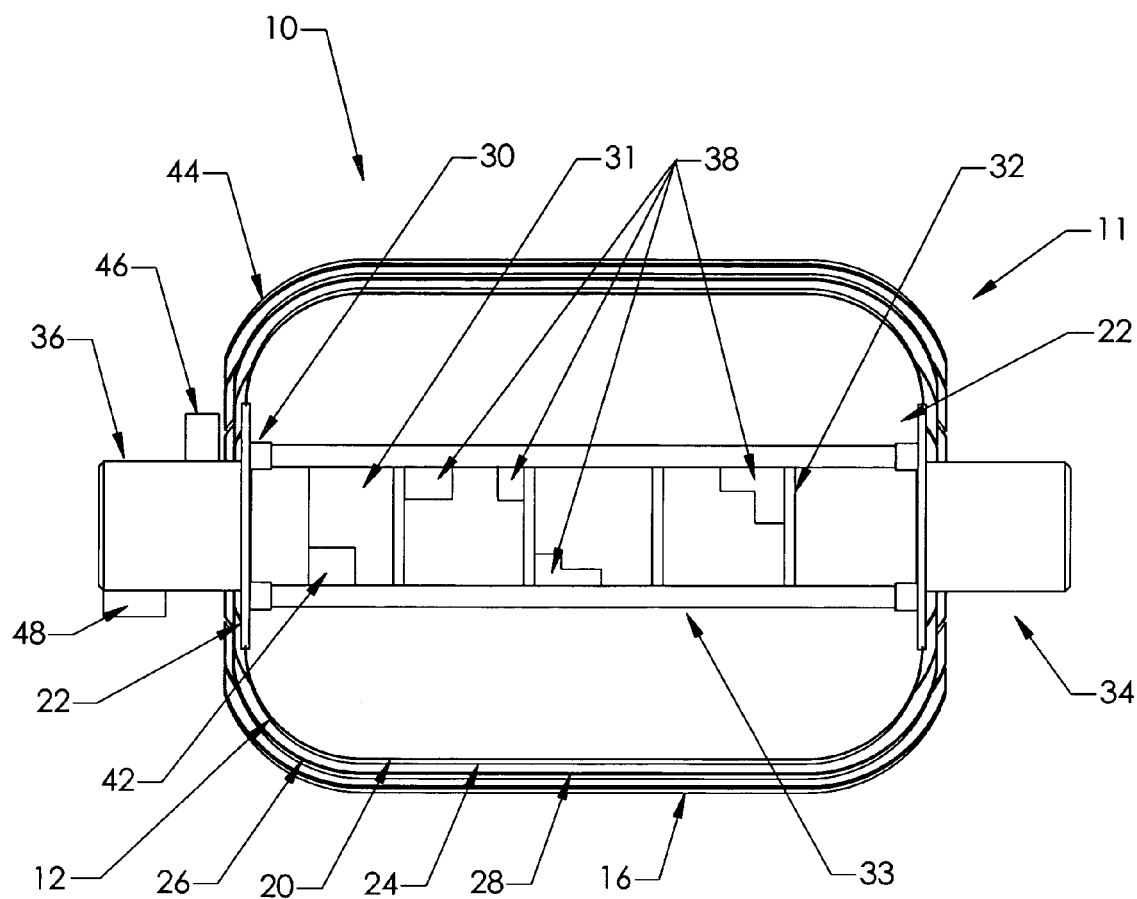
FIG. 1 is a cross-sectional side view of an inflated satellite bus.

The present invention may best be understood by reference to the following description taken in conjunction with the accompanying drawings. FIG. 1 is a cross-sectional side view of an inflated satellite bus 10. The bus is not restricted to a particular size, or shape, as evidenced by the bus in FIG. 1 being large enough to house individuals. This size bus can be used as a platform for a number of satellite missions or as a master satellite to control the operation of other satellites. Illustrated in this figure is the inflatable shell 11. The shell 11 is flexible and there are several variations on the shell including, for example, a variety of flexible meteor shields. In the preferred embodiment, the shell 11 is comprised of an air bladder 12, a meteor shield 14, and a restraint layer 16. Such configurations are known in the art.

The air bladder 12 is a substantially non-permeable material that prevents the gas inside the craft from escaping into space. In the preferred embodiment the air bladder 12 material is Cepac® HD-200. A restraint layer 20 is attached to the bulkheads 22 and the restraint layer 20 substantially transfers the load from the air bladder 12 to the bulkheads 22. In the preferred embodiment, the bulkheads 22 are composed of metal such as aluminum. In the preferred embodiment, the restraint layer 20 is comprised of straps made from Kevlar strands and the restraint layer 20 and the air bladder 12 are connected to the bulkheads.

In the preferred embodiment, the meteor shield 24 is comprised of layers of impacting material 26 such as Nextel separated by layers of spacing material 28. The spacing material 28 in the preferred embodiment is an open celled space rated foam that can be compressed prior to launch and then expands upon deployment. The number of layers can be determined by know techniques depending upon variables such as mission parameters and survivability requirements.

A set of longerons 30 and cross members 32 connect the opposing bulkheads 22. The longerons 30 can be made from a variety of materials depending upon the mission characteristics. In the preferred embodiment, the longerons 30 are substantially comprised of a composite material. In an alternate embodiment, the longerons 30 can be composed of a metallic material. The volume enclosed by the longerons 30 is referred to as the internal volume 31. An airlock 34 allows for access by individuals such as maintenance personnel. A distal end 36 can house an attitude control device, communications equipment, a power source, and a controller that is powered by the power source and operates the attitude control device. The longerons 30 and bulkheads 22 form the core 33 of the craft 10.

Equipment 38 is attached to the longerons 30 and cross members 32. The equipment 34 can be mission specific equipment such as communications equipment roughly correlating to what may be found on conventional communications satellites. In this instance, the equipment 34 would be referred to as a mission payload. Other mission specific equipment configurations can include radar mapping and weather type equipment, although mission specific equipment is not limited such configurations. The equipment 34 may also be multi-purpose equipment such as repeaters to facilitate communications with one or more other satellites.

While this figure illustrates the equipment 34 being housed within the internal volume 31, other equipment, such as antennas, may be placed external to the craft 10. In such a configuration, the equipment 34 is substantially housed within the internal volume 31.

A thermal control system 42 is present to regulate the temperature of the craft 10. A variety of thermal control systems 42 are well known in the art and the specific system can be chosen according to the mission payload characteristics.

The external surface of the craft 44 can also support equipment 46 external to the craft.

A communications device 48 can be used to relay information and instruction to and from a ground station and the craft 10. The communications device 48 can also be used to facilitate communications between other satellites and spacecraft.

Figure 2:
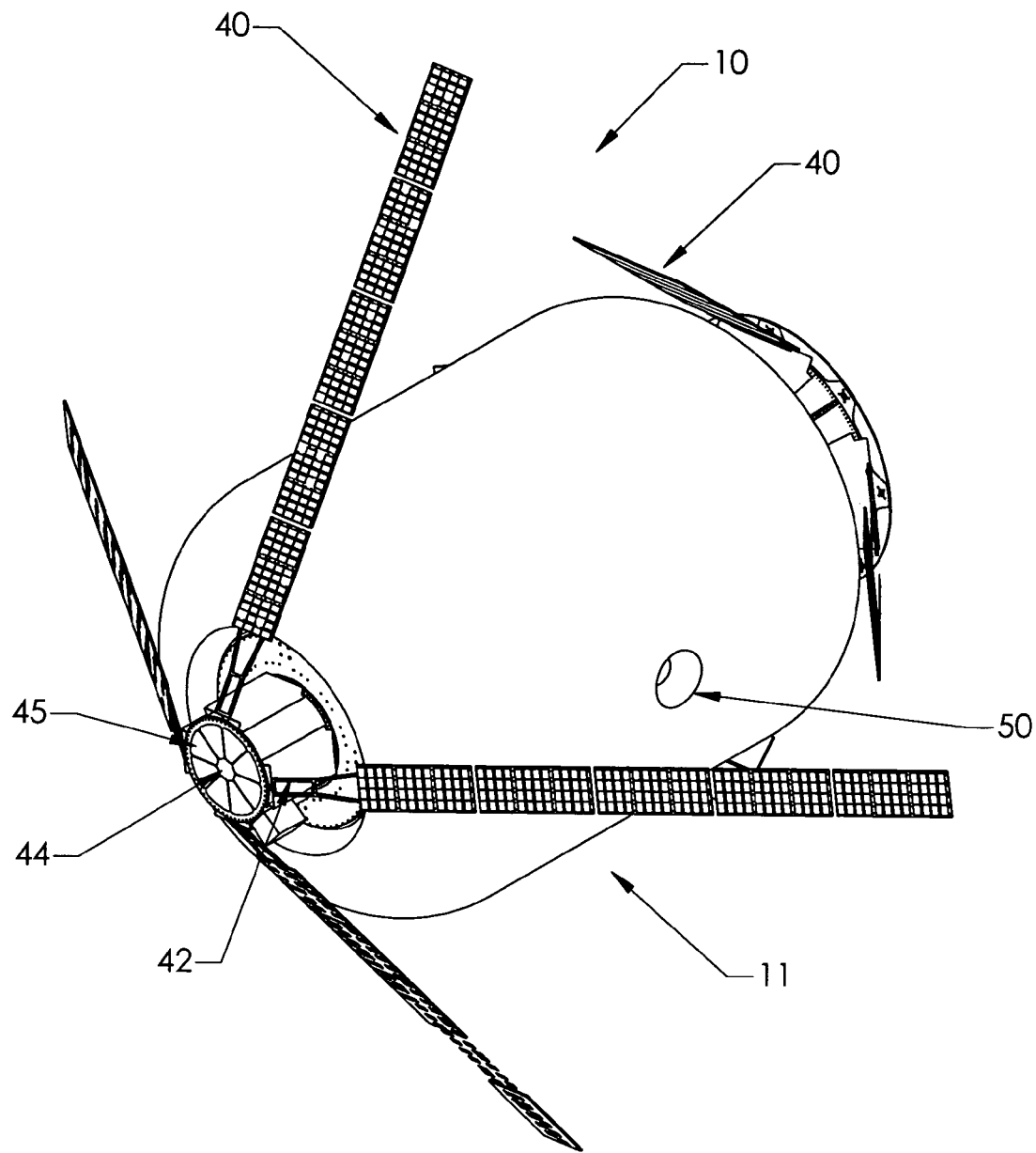
FIG. 2 is a side view of an inflated bus.

Referring now to FIG. 2, the inflated craft 10 is smaller than FIG. 1, and does not have air lock to facilitate humans performing maintenance on the craft. In the preferred embodiment, solar cells 40 form part of the power source 42. However, the power source 42 may also be fuel cells, a nuclear source, or other such power generating devices. The power source 42 can be used not only by the bus, but may also be relied upon by the mission specific equipment.

An attitude control device 44 is relied upon to assist in keeping the craft 10 in proper alignment with the earth. Such devices are well known in the art. Typically, such a device relies upon nozzles and propellants to direct a force for correcting the attitude. Furthermore, a controller 45 directs the operation of the attitude control device 44. Controllers are also well known in the art.

Similar to the craft 10 of FIG. 1, the craft 10 in FIG. 2 can also have a thermal control system, equipment disposed on the external surface, a communications device for communicating with a ground station or other satellites, and equipment substantially within the internal volume of the craft.

The shell 11 can have radar stealth capabilities. This could include using radar absorbing materials and/or geometries that reflect radar waves at angles that make detection of the craft 10 difficult. Many such materials and geometries are well known in the field of aircraft development and manufacture.

The shell 11 may also have desirable radio or microwave characteristics that may allow radio or microwaves to pass through the shell 11 without substantial attenuation. This could allow the mission payloads to transmit and receive information through the shell. In this situation, there would not be any visible way to determine the type of equipment housed in the craft 10.

The shell 11 may also contain a window 50. The window 50 would allow viewing from within the craft 10. This is useful where the equipment inside the craft 10 has optical capabilities such as a camera.

The shell 11 may also be colored as to make visual detection more difficult.

While FIG. 2 does not provide for human access, other embodiments would allow human access. These embodiments do not require an internal volume that would support human habitation, but rather enough volume to allow a person to perform maintenance within the craft. In this fashion, a mission payload could be modified, replaced, or updated by a human maintenance person.

There has thus been described a novel inflatable satellite bus. It is important to note that many configurations can be constructed from the ideas presented. Thus, nothing in the specification should be construed to limit the scope of the claims.

What is claimed is:

1. An inflatable satellite bus comprising:
   a core, the core having an internal volume, and the core adapted to receive a mission payload substantially within the internal volume;
   an inflatable shell attached to the core and substantially enclosing the core;
   an attitude control device coupled to the core;
   a power source coupled to the core; and
   a controller coupled to the attitude control device and the power source such that the controller operates the attitude control device.

2. The inflatable satellite bus of claim 1 further comprising a thermal control system.

3. The inflatable satellite bus of claim 1 wherein the satellite bus further comprises an external surface and elements of the mission payload being disposed on the external surface.

4. The inflatable satellite bus of claim 1 further including a communications device for receiving instructions from a ground station.

5. The inflatable satellite bus of claim 1 further including a communications device for transmitting data to a ground station.

6. The inflatable satellite bus of claim 1 wherein the inflatable shell is substantially stealth.

7. An inflatable satellite bus comprising:
   a core;
   an inflatable shell attached to the core, the inflatable shell substantially enclosing the core and the inflatable shell having an external surface;
   a mission payload disposed substantially on the external surface of the inflatable shell;
   an attitude control device coupled to the core;
   a power source coupled to the core; and
   a controller coupled to the attitude control device and the power source such that the controller operates the attitude control device.

8. The inflatable satellite bus of claim 7 further comprising a thermal control system.

9. The inflatable satellite bus of claim 7 wherein the satellite bus further comprises an internal volume to the core and elements of the mission payload being disposed within the internal volume.

10. The inflatable satellite bus of claim 7 further including a communications device for receiving instructions from a ground station.

11. The inflatable satellite bus of claim 7 further including a communications device for transmitting data to a ground station.

12. The inflatable satellite bus of claim 7 wherein the inflatable shell is substantially stealthy.

13. An inflatable satellite bus comprising:
   a core, the core having an internal volume, and the core adapted to receive a payload substantially within the internal volume;
   an inflatable shell attached to the core and substantially enclosing the core;
   an attitude control device coupled to the core;
   a power source coupled to the core; and
   a controller coupled to the attitude control device and the power source such that the controller operates the attitude control device.

14. The inflatable satellite bus of claim 13 further including a communications device for transmitting commands to other satellites.

15. The inflatable satellite bus of claim 13 further including a communications device for receiving data from other satellites.

16. The inflatable satellite bus of claim 13 further including a communications device for communicating with a ground station.

17. The inflatable satellite bus of claim 13 wherein the satellite bus further comprises an external surface and elements of the payload being disposed on the external surface.

* * * * *